(12) United States Patent
Kim et al.

(10) Patent No.: US 7,458,086 B2
(45) Date of Patent: Nov. 25, 2008

(54) ACTUATOR USED WITH AN OPTICAL PICKUP

(75) Inventors: Seok-Jung Kim, Suwon-si (KR); Yong-hoon Lee, Suwon-si (KR); Sun-mo Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 504 days.

(21) Appl. No.: 11/056,401

(22) Filed: Feb. 14, 2005

(65) Prior Publication Data

US 2005/0190663 A1  Sep. 1, 2005

Related U.S. Application Data

(63) Continuation of application No. 10/247,794, filed on Sep. 20, 2002, now Pat. No. 6,895,593.

(30) Foreign Application Priority Data

Dec. 1, 2001 (KR) ............................... 2001-75671

(51) Int. Cl.
*G11B 7/085* (2006.01)

(52) U.S. Cl. ..................... 720/672; 369/44.11

(58) Field of Classification Search ............ 720/669, 720/672; 369/44.14, 44.21, 53.25, 112.23
See application file for complete search history.

(56) References Cited

U.S. PATENT DOCUMENTS

| 5,729,510 | A | * | 3/1998 | Kasahara et al. | ......... | 369/44.14 |
| 5,864,524 | A | * | 1/1999 | Sakaguchi | ............... | 369/44.21 |
| 5,999,507 | A | * | 12/1999 | Yoshizawa | ............... | 369/53.25 |
| 6,021,107 | A | * | 2/2000 | Tsukahara et al. | .......... | 720/669 |
| 6,285,644 | B1 | * | 9/2001 | Kano | .................... | 369/112.23 |

FOREIGN PATENT DOCUMENTS

| CN | 1115673 | C | 7/2003 |
| EP | 777222 | A1 | 6/1997 |
| EP | 910074 | A2 | 4/1999 |
| EP | 1111603 | A1 | 6/2001 |
| JP | 6-333255 | | 12/1994 |
| JP | 10-106001 | | 4/1998 |
| JP | 2001-23200 | | 1/2001 |

OTHER PUBLICATIONS

European Search Report dated May 13, 2005, issued in corresponding European Patent Application No. 05007845.0.
Chinese Office Action dated Apr. 30, 2004 in Chinese Application No. 2131575.2.

* cited by examiner

*Primary Examiner*—Tianjie Chen
(74) *Attorney, Agent, or Firm*—Stein, McEwen & Bui, LLP

(57) ABSTRACT

An actuator used with an optical pickup includes: a base on which a holder is fixed; a lens holder in which a plurality of installation holes are formed such that a plurality of objective lenses to record and/or reproduce optical discs having different recording densities are installed at different heights; a support member, which movably supports the lens holder, having one end coupled to the lens holder and the other end coupled to the holder; and a magnetic circuit which drives the lens holder in focusing and tracking directions. The plurality of installation holes include a first installation hole in which a first objective lens for at least one type of low density optical disc is installed, and a second installation hole in which a second objective lens for a higher density optical disc than the low density optical disc is installed. When a working distance of the first objective lens for the low density optical disc installed in the first installation hole is represented as WD1, and a working distance of the second objective lens for the high density optical disc installed in the second installation hole is represented as WD2, the first and second installation holes are provided so that the first and second objective lenses are installed to satisfy the Equation: WD1>WD2, a separation distance between the optical disc and the second objective lens=WD2+α, where, α=|WD1−WD2|×(0.1-1.0). The second installation hole is located in a more outer circumference of the optical disc than the first installation hole.

31 Claims, 11 Drawing Sheets

ACTUATOR USED WITH AN OPTICAL PICKUP

CROSS-REFERENCE TO RELATED APPLICATIONS

This application is a continuation of prior U.S. patent application Ser. No. 10/247,794 filed on Sep. 20, 2002 now U.S. Pat. No. 6,895,593 in the United States Patent and Trademark Office. This application claims the benefit of Korean Application No. 2001-75671, filed Dec. 1, 2001 in the Korean Industrial Property Office, the disclosure of which is incorporated herein by reference.

BACKGROUND OF THE INVENTION

1. Field of the Invention

The present invention relates to an actuator used with an optical pickup, and more particularly, to an actuator used with an optical pickup having a plurality of objective lenses so that a plurality of optical discs having different recording densities can be recorded and/or reproduced.

2. Description of the Related Art

It is well-known that digital versatile discs (DVDs) are recorded and/or reproduced using light having a wavelength of 650 nm (or 635 nm) and using an objective lens having a numeral aperture of 0.6 (0.65 in the case of a recordable disc). In the case of DVDs having a diameter of 120 mm and a track pitch of 0.74 μm, DVDs have a capacity of 4.7 or more gigabytes for a single surface. Accordingly, DVDs are not suitable for a recording medium on which high definition (HD) moving picture information is to be recorded. This is the reason that a recording capacity of 23 or more gigabytes for a single surface is required so that 135-minute HD moving picture information can be recorded on the recording medium.

To meet the need of a high density recording capacity, high density optical discs using light having a wavelength shorter than that of a red color, i.e., blue light, and an objective lens having a numerical aperture greater than 0.6 and having a more narrow track have been developed and standardized.

In order to obtain an adequate tolerance with respect to tilt of optical discs, as the numerical aperture of an objective lens increases for high density, the thickness of optical discs should be reduced. Considering allowable tolerance with respect to the tilt of optical discs, the 1.2 mm thickness of compact discs (CDs) is reduced to 0.6 mm for DVDs, and there are further possibilities that the thickness of blu-ray discs (BDs) is reduced to 0.1 mm. Regarding the numerical aperture of an objective lens, the 0.45 numerical aperture of CDs is increased to 0.6 for DVDs, and there are further possibilities that the numerical aperture for BDs is 0.85. Also, considering a recording capacity, there are good possibilities of adopting a light source such as a blue light source for high density discs, i.e., BD and HD DVD. Here, high density discs include a BD and a high definition DVD (HD DVD). The thickness of HD DVDs is 0.6 mm. The numerical aperture for HD DVDs is 0.65. In the development of optical discs with new specifications, compatibility with existing optical discs is important.

However, a special technique is required to design and manufacture an objective lens having a high numerical aperture of about 0.85 as a single lens. Besides, it is difficult to make the working distance of an objective lens having a high numerical aperture be as long as that of an objective lens for DVDs.

Accordingly, to solve the working distance problem, in a compatible optical pickup in which optical discs having high densities can be recorded and/or reproduced, at least one objective lens used to record and/or reproduce CDs and/or DVDs, and an objective lens for high density recording having a higher numerical aperture than the previous objective lens should be separately provided.

For driving in both directions, i.e., a focusing direction and a tracking direction, an actuator for an optical pickup has a magnetic circuit. The actuator maintains an interval between an optical disc and an objective lens in the focusing direction and moves the objective lens in a desired track position (center of a track). As described above, however, the above-mentioned optical pickup adopting a plurality of optical discs having different recording densities requires objective lenses corresponding to the plurality of optical discs having different recording densities, and thus an actuator used with an optical pickup having a plurality of objective lenses loads a plurality of objective lenses on a moving portion so as to move in the focusing and tracking directions.

Referring to FIG. 1, an actuator disclosed in Japanese Patent Publication No. Hei 10-106001 includes a lens holder (bobbin: 7) at which two objective lenses 2 and 3 are installed, a rotation axis 1 which rotatively guides the lens holder 7, and a magnetic circuit which drives the objective lenses 2 and 3 in focusing and tracking directions.

The two objective lenses 2 and 3 are arranged at a predetermined angle θ with respect to the center of the rotation axis 1 and rotate simultaneously at the predetermined angle θ with respect to the rotation axis 1.

The magnetic circuit includes focusing and tracking coils 8 and 9 installed at the lens holder 7, yokes 5a and 5b, and a plurality of magnets 6. The plurality of magnets 6 are arranged at an angle greater than the predetermined angle of the objective lenses 2 and 3 with respect to the rotation axis 1. The tracking coil 9 is provided to correspond to the magnets 6.

In a conventional actuator having the above structure as illustrated in FIG. 1, the two objective lenses 2 and 3, arranged at the predetermined angle θ with respect to the rotation axis 1 within one lens holder 7, rotate simultaneously by the predetermined angle θ with respect to the rotation axis 1 such that a plurality of optical discs having different recording densities and thicknesses can be recorded and/or reproduced. Detailed descriptions of the conventional actuator illustrated in FIG. 1 and disclosed in Japanese Patent Publication No. Hei 10-106001 will be omitted.

Since the above conventional actuator requires a complicated magnetic circuit to control the positions of the objective lenses 2 and 3 before and after the objective lenses 2 and 3 rotate simultaneously by the predetermined angle θ with respect to the rotation axis 1, and an additional structure in which the objective lenses 2 and 3 rotate simultaneously by the predetermined angle θ with respect to the rotation axis 1, the entire structure of the conventional actuator is complicated.

Since the above conventional actuator presents an axis perturbation type design, sensitivity is relatively low and non-linear properties are relatively large, the above conventional actuator is less suitable to record and/or reproduce high density optical discs than DVDs.

Moreover, in the above conventional actuator, compared to the structure of an existing actuator in which one objective lens is installed in a bobbin, the moving portion of the above conventional actuator is large, and heavier, and thus the actuator sensitivity is further degraded.

SUMMARY OF THE INVENTION

Accordingly, to an aspect of the present invention, there is provided an actuator used with an optical pickup having an improved structure, more simple than the entire structure of a conventional actuator for an optical pickup, in which two objective lenses are installed in one lens holder, the weight of a moving portion of the actuator is reduced and the actuator sensitivity is improved.

According to another aspect of the present invention, there is provided an actuator for an optical pickup including: a base on which a holder is fixed; a lens holder in which a plurality of installation holes are formed such that a plurality of objective lenses to record and/or reproduce optical discs having different recording densities are installed at different heights; a support member, which movably supports the lens holder, having one end coupled to the lens holder and the other end coupled to the holder; and a magnetic circuit which drives the lens holder in focusing and tracking directions, the plurality of installation holes include a first installation hole in which a first objective lens for at least one type of low density optical disc is installed, and a second installation hole in which a second objective lens for a higher density optical disc than the low density optical disc is installed, wherein when a working distance of the first objective lens for the low density optical disc installed in the first installation hole is represented as WD1, and a working distance of the second objective lens for the high density optical disc installed in the second installation hole is represented as WD2, the first and second installation holes are provided so that the first and second objective lenses are installed to satisfy the Equation:

$$WD1 \geq WD2$$

a separation distance with respect to the optical disc and the second objective lens=$WD2+\alpha$ where, $\alpha = |WD1-WD2| \times (0.1 \sim 1.0)$, and the second installation hole is located in a more outer circumference of the optical disc than the first installation hole.

According to an aspect of the present invention, a center of the second installation hole may be located in a position corresponding to about R=21 mm from a center of an optical disc and a center of the first installation hole may be located in a position corresponding to R=14.4–18.4 mm from the center of the optical disc.

According to an aspect of the present invention, the first and second installation holes may be arranged in a direction corresponding to the direction of a radius of the optical disc.

According to an aspect of the present invention, the low density optical disc may be at least one selected from a CD-family optical disc and a DVD-family optical disc, and the high density optical disc has a higher density than the DVD-family optical disc.

According to an aspect of the present invention, when the first objective lens installed in the first installation hole is a lens used for both a CD and a DVD, a working distance of the first objective lens with respect to a CD is represented as $WD_{CD}$ and a working distance of the first objective lens with respect to a DVD is represented as $WD_{DVD}$, the first objective lens may be installed in the first installation hole so that a separation distance with respect to the optical disc of the first objective lens satisfies the Equation, thereby reducing the entire moving distance of the actuator:

$$WD_{DVD} \geq WD_{CD}$$

$WD_{CD} \leq$ a separation distance with respect to the optical disc of the first objective lens $\leq WD_{DV}$.

According to an aspect of the present invention, the first and second objective lenses may be installed in the first and second installation holes, respectively, so that, when the optical disc is installed and the second objective lens operates, contact between the first objective lens and a stack ring formed in a CD and a DVD is prevented.

According to an aspect of the present invention, the first and second objective lenses may be installed in the first and second installation holes, respectively, so that, when the optical disc is installed and the second objective lens operates, contact between the first objective lens and a stack ring formed in a CD and a DVD is prevented.

According to an aspect of the present invention, the actuator may further include a liquid crystal panel correcting a spherical aberration caused by a difference in thickness of optical discs and being disposed below the second objective lens inside the lens holder in which the first and second objective lenses are installed.

According to an aspect of the present invention, a printed circuit board (PCB) forming a conductive line path may be attached to one side of the liquid crystal panel.

According to an aspect of the present invention, a PCB plate may be attached to sides of the second objective lens of the lens holder and connection between the PCB forming the conductive line path and the PCB plate may be performed by soldering in the state where an end of the PCB plate is located on the PCB forming the conductive line path.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
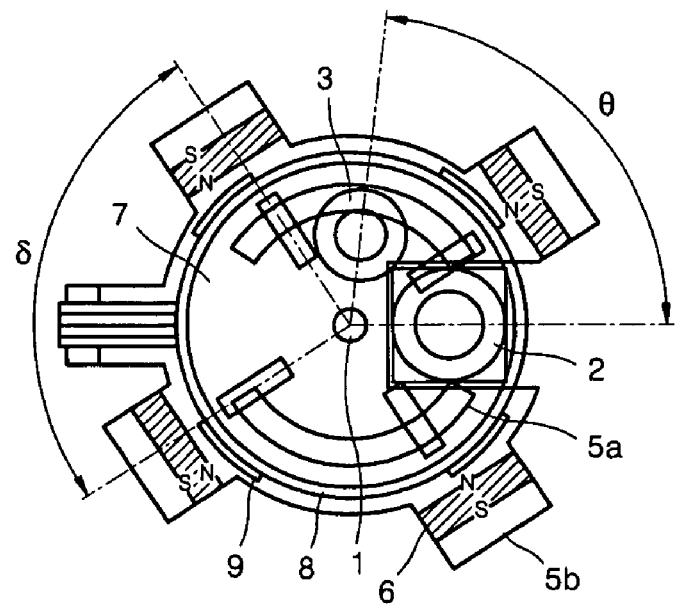
FIG. 1 is a schematic view of a conventional actuator.

Reference will now be made in detail to the embodiments of the present invention, examples of which are illustrated in the accompanying drawings, wherein like reference numerals refer to like elements throughout. The embodiments are described below in order to explain the present invention by referring to the figures.

An actuator used with an optical pickup according to an embodiment of the present invention is a two-axis driving apparatus in which a plurality of objective lenses having different working distances are installed in one lens holder, and a moving portion of the actuator moves independently in focusing and tracking directions. The actuator used with an optical pickup according to an embodiment of the present invention can be adopted in optical pickups to record and/or reproduce two kinds of optical discs, such as high density disc and DVD, having different recording densities, or in optical pickups to record and/or reproduce three or more kinds of optical discs, such as high density disc, DVD, and CD, having different recording densities.

Figure 2:
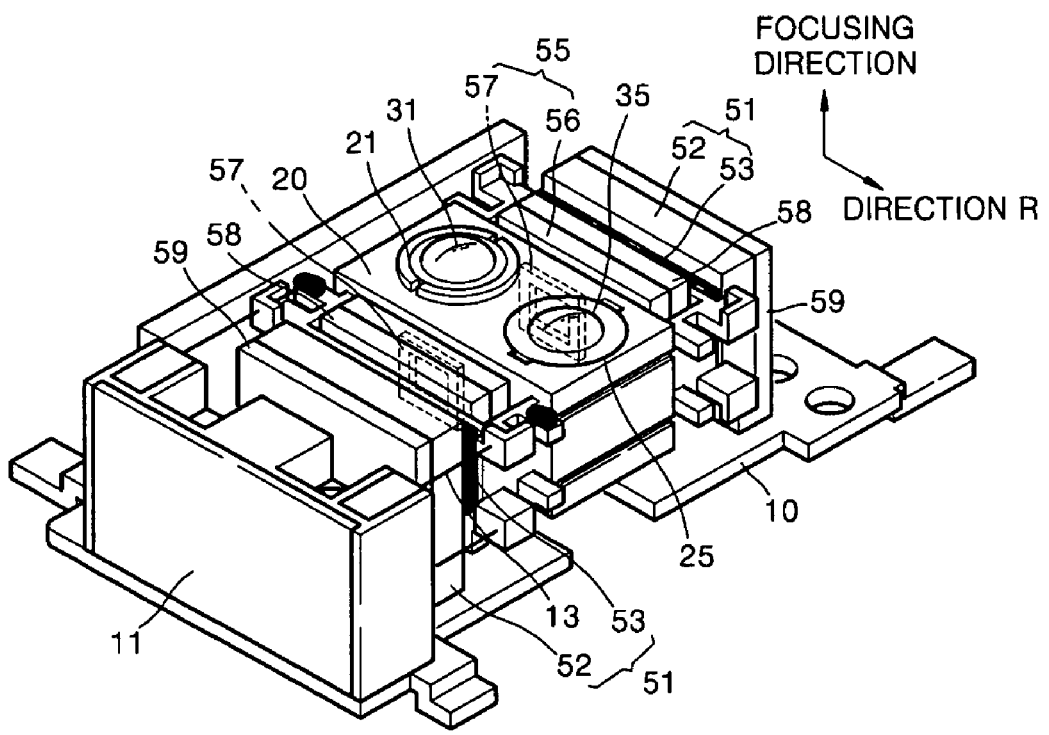
FIG. 2 is a schematic perspective view of the entire structure of an actuator used with an optical pickup according to an embodiment of the present invention.
Figure 3:
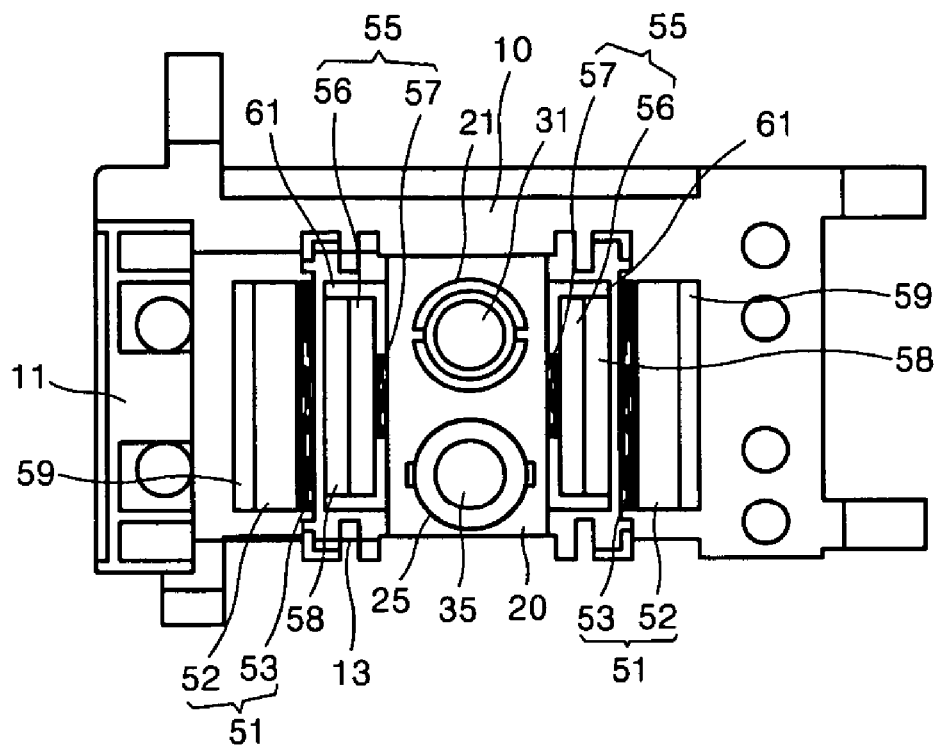
FIG. 3 is a top view of the actuator of FIG. 2.
Figure 4:
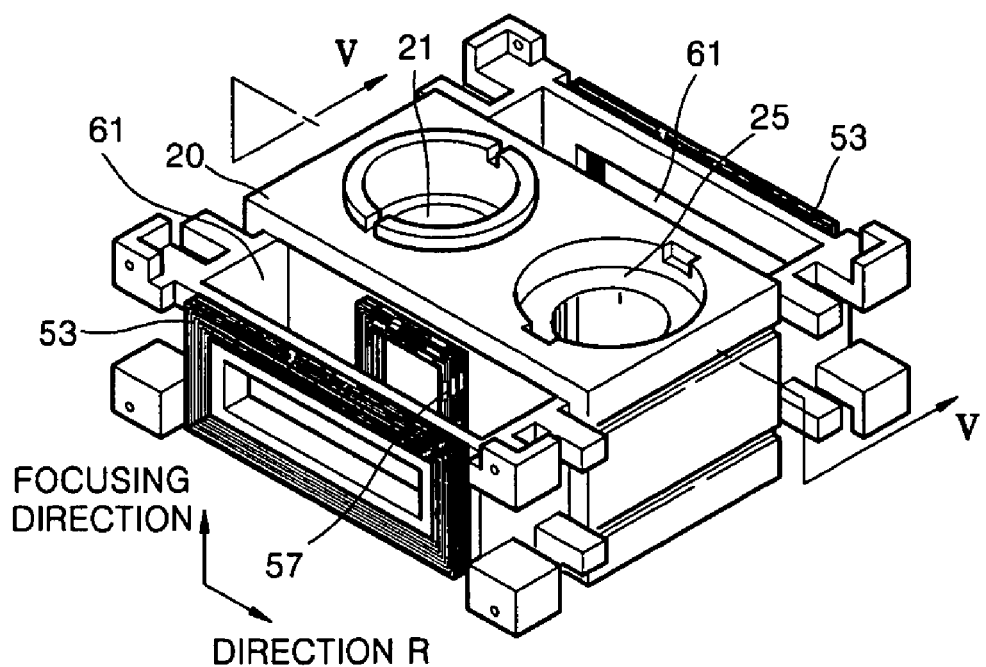
FIG. 4 is a perspective view of the lens holder illustrated in FIG. 2.
Figure 5:
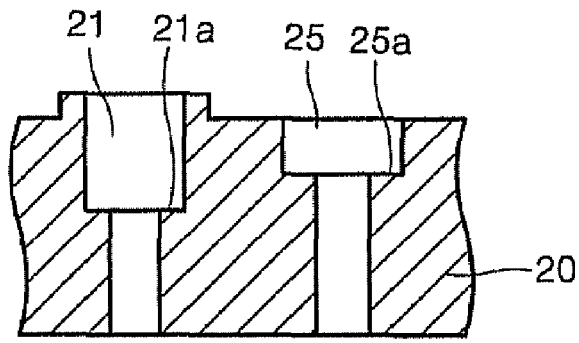
FIG. 5 is a partial cross-sectional view taken along line V-V of FIG. 4.

FIG. 2 is a schematic perspective view of the entire structure of an actuator for an optical pickup according to an embodiment of the present invention, FIG. 3 is a top view of FIG. 2, FIG. 4 is a perspective view of the lens holder illustrated in FIG. 2, and FIG. 5 is a cross-sectional view taken along line V-V of FIG. 4.

Referring to FIGS. 2 through 5, the actuator for an optical pickup according to an embodiment of the present invention includes a base 10 having a holder 11 installed at one side of the base 10, a lens holder 20 on which a plurality of installation holes 21 and 25 are formed so that a plurality of objective lenses 31 and 35 having different working distances are installed on the lens holder 20, a support member 13 (suspension), which movably supports the lens holder 20, having one end coupled to the lens holder 20 and the other end coupled to the holder 11, and a magnetic circuit which drives the lens holder 20 in focusing and tracking directions.

The plurality of objective lenses 31 and 35 includes a first objective lens 31 used to record and/or reproduce at least one kind of low density optical disc having different recording densities, and a second objective lens 35 used to record and/or reproduce higher density optical discs (hereinafter, high density optical discs) than the low density optical discs. The first and second objective lenses 31 and 35 have different working distances. For example, the first objective lens 31 can record and/or reproduce DVD-family optical discs (hereinafter, DVDs), as low density optical discs, and can additionally record and/or reproduce CD-family optical discs (hereinafter, CDs). Also, for example, the second objective lens 35 can record and/or reproduce higher density optical discs than DVDs. Here, the plurality of objective lenses 31 and 35 may include three or more objective lenses having different working distances so that the plurality of objective lenses 31 and 35 can be used to record and/or reproduce three or more kinds of optical discs having different recording densities.

The actuator according to an embodiment of the present invention is provided so that the plurality of objective lenses 31 and 35 can be installed in one lens holder 20 in a direction (R direction) corresponding to the direction of a radius of an optical disc, and the actuator can be compatible with an optical pickup which requires a plurality of objective lenses. This is the reason that the optical pickup records and/or reproduces an information signal while moving in the direction of the radius of the optical disc in an optical disc drive.

The actuator used with an optical pickup according to an embodiment of the present invention is provided so that the second objective lens 35 for a high density optical disc is installed in a more inner diameter of the optical disc than the first objective lens 31 for a low density optical disc. This is the reason that a region in which data recording and/or reproduction of a high density optical disc starts in a more inner diameter location than a region in which data recording and/or reproduction of a DVD of a low density optical disc starts.

As described above, when the actuator used with an optical pickup according to an embodiment of the present invention has a structure in which the two objective lenses 31 and 35 are installed in the lens holder 20, as illustrated in FIG. 4, a first installation hole 21 in which the first objective lens 31 is installed, and a second installation hole 25 in which the second objective lens 35 is installed are formed in the lens holder 20. Here, the number of installation holes formed in the lens holder 20 corresponds to the number of objective lenses to be installed.

The first and second installation holes 21 and 25 are arranged in the direction R, as illustrated in FIGS. 4 and 5, and are provided so that the first and second objective lenses 31 and 35 are installed at different heights with respect to each other. Specifically, an installation projection 21a is formed in the first installation hole 21 at a relatively deep position from an upper side opposite to the optical disc of the lens holder 20 such that the first objective lens 31, having a longer working distance for a low density optical disc, can be installed. An installation projection 25a is formed in the second installation hole 25 at the same height as an upper side opposite to the optical disc of the lens holder 20 (or at a position closer to the upper side of the lens holder 20 than the first installation projection 21a formed in the first installation hole 21) such that the second objective lens 35, having a shorter working distance for a high density optical disc, can be installed therein.

When a working distance of the first objective lens 31 for a low density optical disc installed in the first installation hole 21 is represented as WD1, and a working distance of the second objective lens 35 for a high density optical disc installed in the second installation hole 25 is represented as WD2, the first and second installation holes 21 and 25 should be provided so that the first and second objective lenses 31 and 35 can be installed to satisfy the following equation:

$$WD1 \geq WD2 \qquad \text{Equation 1:}$$

a separation distance between the optical disc and the second objective lens=WD2+α where, α=|WD1−WD2|×(0.1~1.0).

Figure 6:
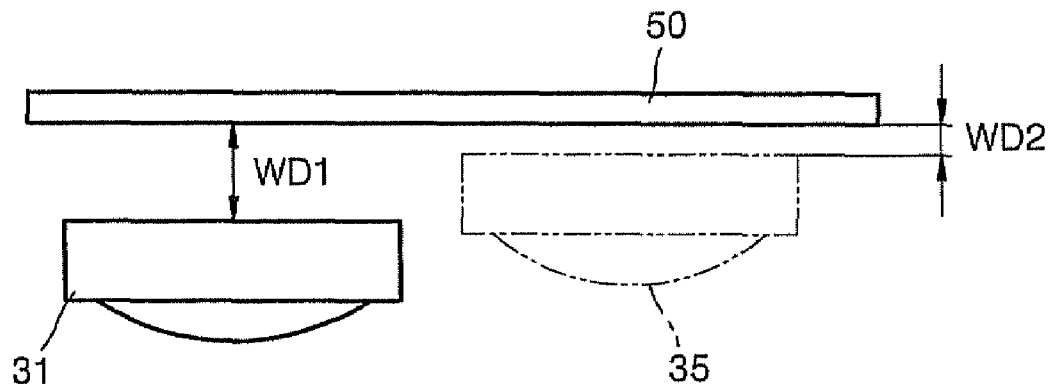
FIG. 6 illustrates a separation distance between an optical disc and two objective lenses when the two objective lenses having different working distances are installed in an existing actuator for an optical pickup.

FIG. 6 illustrates a separation distance between an optical disc 50 and the first and second objective lenses 31 and 35 when the first and second objective lenses 31 and 35, having different working distances, are installed in an existing actuator for an optical pickup.

Figure 7:
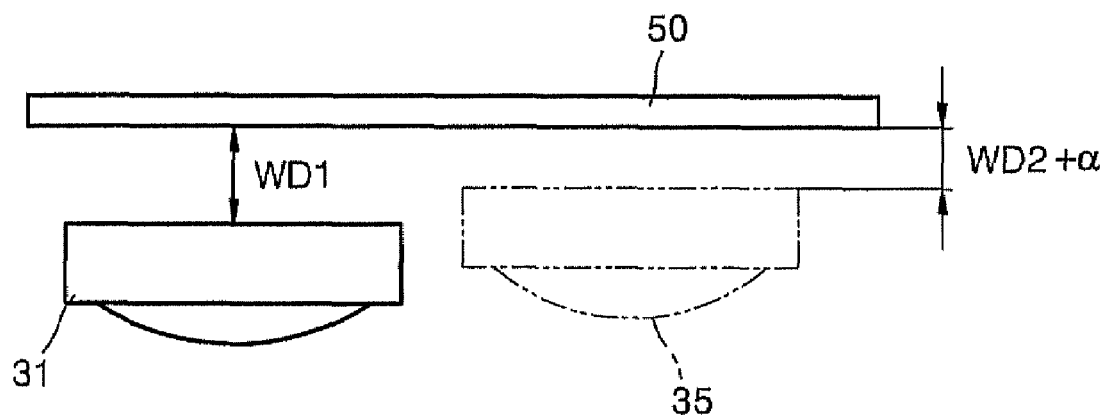
FIG. 7 illustrates a separation distance between an optical disc and two objective lenses when the two objective lenses having different working distances are installed in the lens holder of the actuator used with an optical pickup according to an embodiment of the present invention.

FIG. 7 illustrates a separation distance between the optical disc 50 and the first and second objective lenses 31 and 35 when the first and second objective lenses 31 and 35, having different working distances, are installed in the lens holder 20 of the actuator used with an optical pickup according to an embodiment of the present invention.

As seen from the comparison of FIG. 6 and FIG. 7, if the first and second installation holes 21 and 25 are formed so that the first and second objective lenses 31 and 35 can be installed while satisfying the above Equation 1, a basic separation distance between the second objective lens 35 and the optical disc 50 is WD2+α. Thus, contact (interference) between the second objective lens 35, having a shorter working distance, and the optical disc 50 can be prevented when the optical disc 50 is initially installed, and when the first objective lens 31 having a longer working distance operates.

Referring back to FIGS. 2 and 3, in the actuator used with an optical pickup according to an embodiment of the present invention, the magnetic circuit is divided into a first magnetic circuit 51 to drive the first and second objective lenses 31 and 35 in the focusing direction, and a second magnetic circuit 55 to drive the first and second objective lenses 31 and 35 in the tracking direction, thereby reducing the weight of the moving portion. Here, the first and second magnetic circuits 51 and 55 are installed at the same side of the lens holder 20 (preferably, but not necessarily, at a side parallel with the direction R).

Here, in an optical pickup assembly when the first and second objective lenses 31 and 35 are installed in the lens holder 20 of the actuator according to an embodiment of the present invention, the moving portion includes the lens holder 20, the first and second objective lenses 31 and 35, and a magnetic circuit portion (preferably, but not necessarily, focusing and tracking coils 53 and 57) installed in the lens holder 20.

The first magnetic circuit 51 includes the focusing coil 53 and a focusing magnet 52. The focusing coil 53 is installed at both sides of the lens holder 20, parallel with the direction R, and the focusing magnet 52 is installed on the base 10 to be opposite to the focusing coil 53.

Figure 8:
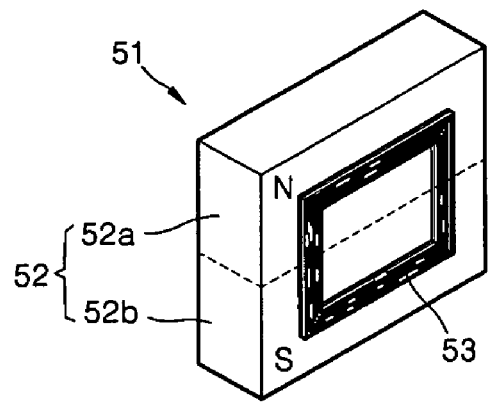
FIG. 8 is a schematic perspective view of a first magnetic circuit adopted in the actuator used with an optical pickup of FIG. 2.
Figure 9A:
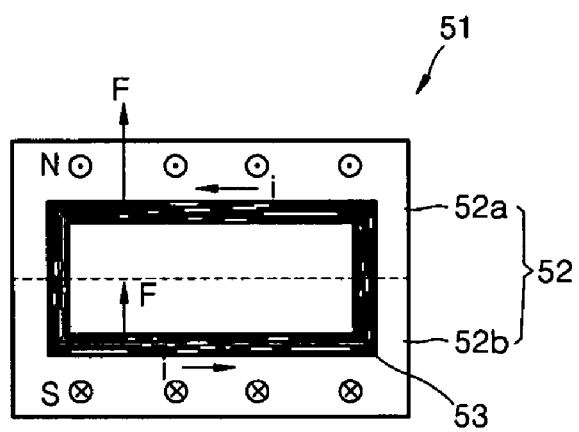
FIGS. 9A and 9B illustrate a principle of driving the lens holder in a focusing direction by the first magnetic circuit of FIG. 8.
Figure 9B:
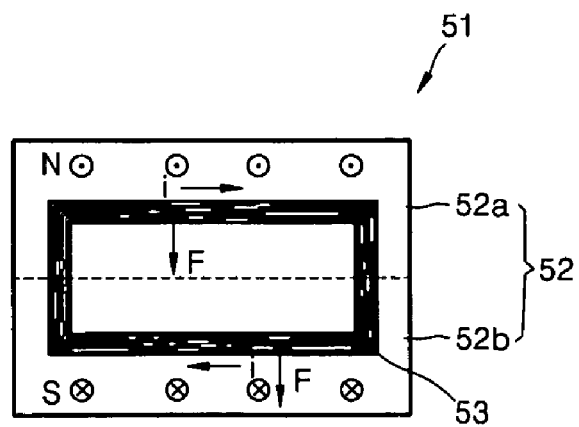

As illustrated in FIG. 8, the focusing magnet 52 is a two-pole magnetized polarization magnet, and the focusing coil 53 is formed in a rectangular shape in which long sides of the focusing coil 53 are put on the N-pole portion 52a and S-pole portion 52b of the focusing magnet 52. In this case, as illustrated in FIGS. 9A and 9B, portions corresponding to a pair of long sides of the focusing coil 53 are the effective focusing coil which contributes to generate an electromagnetic force. Likewise, when the portions corresponding to a pair of long sides of the focusing coil 53 having a rectangular shape act as an effective focusing coil, the overall length of the focusing coil 53 installed in the moving portion of the actuator can be reduced.

Here, as the N-pole portion 52a of the focusing magnet 52 is placed on the upper side of the S-pole portion 52b of the focusing magnet 52 and the magnetic field from the N-pole portion 52a protrudes from the paper, as illustrated in FIG. 9A, when current flows counterclockwise through the focusing coil 53, a force is applied in the upper direction of the portions corresponding to a pair of long sides of the focusing coil 53, according to Flemings' left hand rule. When the current flows clockwise through the focusing coil 53, as illustrated in FIG. 9B, the force is applied in the lower direction of the portions corresponding to a pair of long sides of the focusing coil 53. Thus, when the polarity and amount of the current flowing through the focusing coil 53 are adjusted, the position in the focusing direction of the first and second objective lenses 31 and 35 installed in the lens holder 20 can be controlled.

The second magnetic circuit 55 includes the tracking coil 57 and a tracking magnet 56. In this case, the tracking coil 57 is installed at both sides of the lens holder 20, and the tracking magnet 56 is installed on the base 10 to be opposite to the tracking coil 57.

Figure 10:
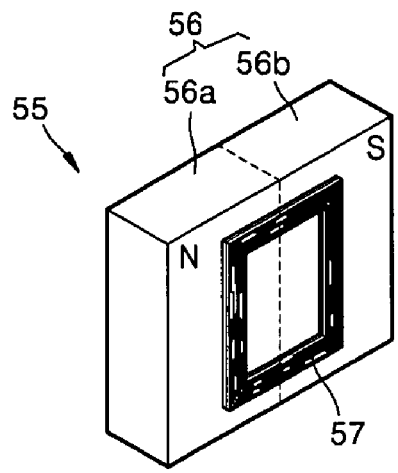
FIG. 10 is a schematic perspective view of a second magnetic circuit adopted in the actuator used with an optical pickup of FIG. 2.
Figure 11A:
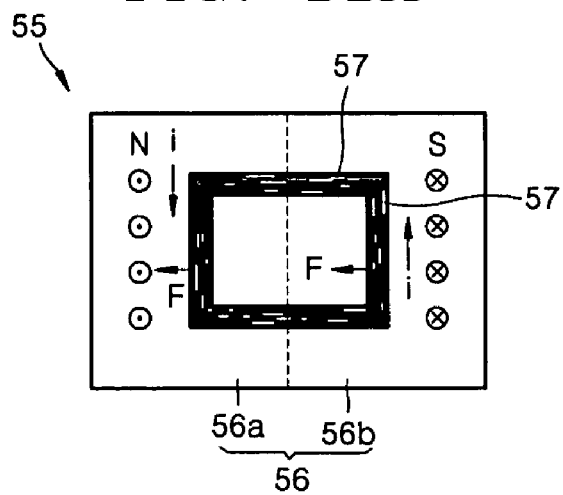
FIGS. 11A and 11B illustrate a principle of driving the lens holder in a focusing direction by the magnetic circuit of FIG. 10.
Figure 11B:
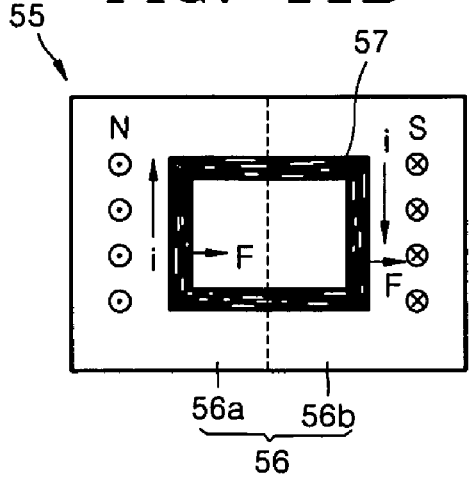

As illustrated in FIG. 10, the tracking magnet 56 is a two-pole magnetized polarization magnet in the direction R, and the tracking coil 57 is formed in a rectangular shape in which long sides of the tracking coil 57 are put on the N-pole portion 56a and S-pole portion 56b of the tracking magnet 56. In this case, as illustrated in FIGS. 11A and 11B, portions corresponding to a pair of long sides of the tracking coil 57 are the effective tracking coil which contributes to generate an electromagnetic force. Likewise, when the portions corresponding to a pair of long sides of the tracking coil 57 having a rectangular shape act as an effective focusing coil, the overall length of the tracking coil 57 installed in the moving portion of the actuator can be reduced.

Here, when the N-pole portion 56a of the tracking magnet 56 is placed on the left side of the S-pole portion 56b of the tracking magnet 56, and the magnetic field from the N-pole portion 56a protrudes from paper, as illustrated in FIG. 11A, when current flows counterclockwise through the tracking coil 57, the force is applied in the left direction of the portions corresponding to a pair of long sides of the tracking coil 57. When the current flows clockwise through the tracking coil 57, as illustrated in FIG. 11B, the force is applied in the right direction of the portions corresponding to a pair of long sides of the tracking coil 57. Thus, when the polarity and amount of the current flowing through the tracking coil 57 are adjusted, the position in the tracking direction of the first and second objective lenses 31 and 35 installed in the lens holder 20 can be controlled.

Figure 12:
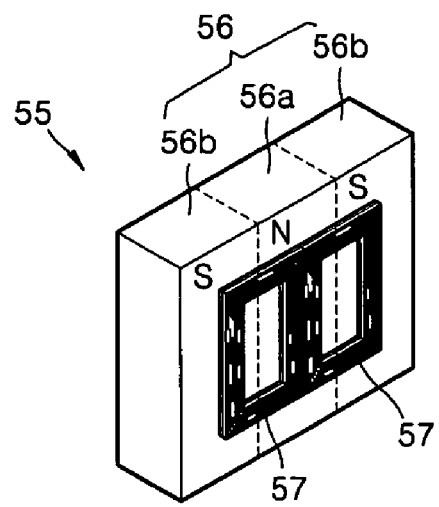
FIG. 12 is a schematic perspective view of another embodiment of the second magnetic circuit of FIG. 10 adopted in the actuator used with an optical pickup of FIG. 2.

Alternatively, as illustrated in FIG. 12, a three-pole magnetized polarization magnet in the direction R may be used as the tracking magnet 56. Two tracking coils 57 are provided so that both long sides of the tracking coils 57 are put on the N-pole portion 56a and S-pole portions 56b of the tracking magnet 56. Here, in the arrangement between the three-pole magnetized tracking magnet 56 and the two tracking coils 57, the direction of the force applied to the tracking coils 57 can be determined from FIGS. 11A and 11B according to the direction of the current flowing through the tracking coils 57, and thus detailed descriptions thereof will be omitted.

Consequently, since the magnetic circuit can increase the length of the effective focusing coil and the length of the effective tracking coil, the overall lengths of the focusing coil 53 and the tracking coil 57 can be reduced, and thus the weight of the moving portion of the actuator can be reduced.

The actuator used with an optical pickup according to this embodiment of the present invention further includes an internal yoke 58 and an external yoke 59 so that the intensity of an effective magnetic field to generate a driving force in the focusing direction can be increased by guiding a magnetic flux generated in the focusing magnet 52.

Figure 13:
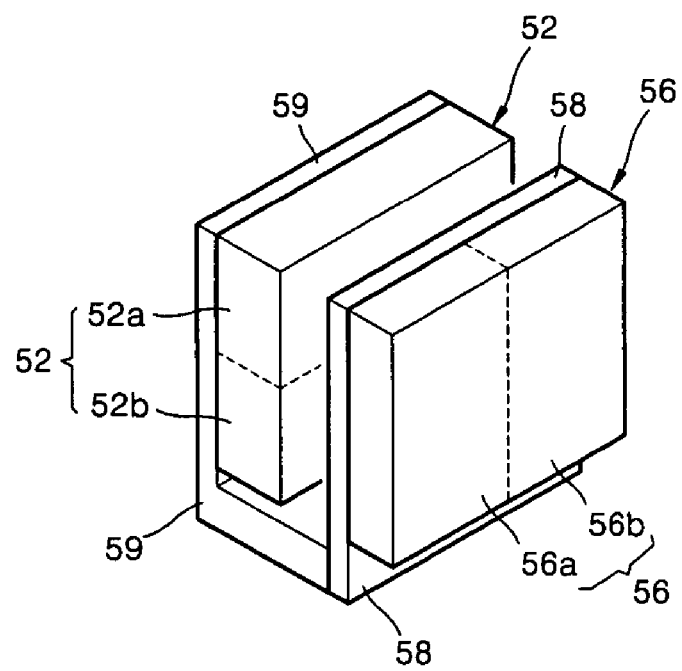
FIG. 13 is a perspective view of a focusing magnet and internal and external yokes to guide a magnetic flux generated by the focusing magnet illustrated in FIG. 2.

FIG. 13 is a perspective view of the focusing magnet 52 and internal and external yokes 58 and 59 to guide a magnetic flux generated in the focusing magnet 52 illustrated in FIG. 2. The internal and external yokes 58 and 59 may be formed monolithically of the same material as that of the base 10. Here, one of the internal and external yokes 58 and 59 may be included so as to guide the magnetic flux generated in the focusing magnet 52.

As described above, when the actuator used with an optical pickup according to this embodiment of the present invention further includes the internal and external yokes 58 and 59, the focusing magnet 52 is installed at one side facing the lens holder 20 of the external yoke 59, and the internal yoke 58 is located between the focusing coil 53 and the center of the lens holder 20. Thus, as illustrated in FIG. 4, an insertion hole 61, into which the internal yoke 58 is inserted, is further included in the lens holder 20.

As illustrated in FIGS. 2 and 13, the internal yoke 58 may be used as a mount for the tracking magnet 56 of the second magnetic circuit 55. In this case, the tracking magnet 56 is installed at a side facing the center of the lens holder 20 of the internal yoke 58. The tracking coil 57 is installed in the lens holder 20 to be opposite to the tracking magnet 56 in the insertion hole 61.

As described above, when the actuator used with an optical pickup according to this embodiment of the present invention includes the internal and external yokes 58 and 59, and the internal yoke 58 is used as a mount to install the tracking magnet 56, and the tracking coil 57 is arranged at a side toward the center of the lens holder 20 of the insertion hole 61, the insertion hole 61 has a size in which movement in the focusing and tracking directions of the lens holder 20 is not affected by the internal yoke 58, the tracking magnet 56, and the tracking coil 57 located in the insertion hole 61. Here, when the lens holder 20 largely deviates from a desired position, the lens holder 20 is suspended by the internal yoke 58 inserted in the insertion hole 61, and the movement of the lens holder 20 is limited, and thus the internal yoke 58 guides the movement of the lens holder 20.

As described with reference to FIGS. 2 and 13, if the intensity of the effective magnetic field is maximized while providing the internal and external yokes 58 and 59, and the focusing coil 53 is formed in a rectangular shape such that both long sides of focusing coil 53 are put on the N-pole and S-pole portions 52a and 52b of the focusing magnet 52 while providing a two-pole magnetized polarization magnet, i.e., the focusing magnet 52, the poles being disposed in the focusing direction, the length of the focusing coil 53 to generate a magnetic driving force of a desired size, and the corresponding occupied volume can be reduced. Also, if the tracking coil 57 is formed in a rectangular shape such that both long sides of the tracking coil 57 are put on the N-pole and S-pole portions 56a and 56b of the tracking magnet 56 while providing a two-pole or three-pole magnetized polarization magnet, the poles being disposed in the direction R, the length of the tracking coil 57 to generate a magnetic driving force of a desired size, and the corresponding occupied volume can be reduced. Consequently, the weight of the moving portion can be reduced greatly by the structure of the magnetic circuit using the polarization magnets as the focusing and tracking magnets 52 and 56.

In the actuator used with an optical pickup according to the embodiments of the present invention, since the two objective lenses 31 and 35 are installed in the lens holder 20, the weight of the objective lenses 31 and 35 installed in the lens holder 20 is increased compared with an existing actuator in which one objective lens is installed in one lens holder. However, in the actuator used with an optical pickup according to the embodiments of the present invention, since the magnetic circuit is divided into the first magnetic circuit 51 to move the magnetic circuit in the focusing direction and the second magnetic circuit 55 to move the magnetic circuit in the tracking direction, and the polarization magnets provide the focusing and tracking magnets 52 and 56, the weight of the magnetic circuit (in particular, the focusing coil 53 and the tracking coil 57) installed in the moving portion of the actuator can be reduced as compared with the existing actuator, and moreover, the electromagnetic force to move in the focusing and tracking directions is greater than that of an existing actuator. Even though the moving portion of the actuator used with an optical pickup according to the embodiments of the present invention is heavier than that of an existing actuator in which only one objective lens is installed in the lens holder, reduction in sensitivity can be prevented. Also, the weight of the moving portion of the actuator used with an optical pickup according to the embodiments of the present invention may be not heavier than that of the existing actuator in which only one objective lens is installed in the lens holder.

As described above, the actuator used with an optical pickup according to an embodiment of the present invention is provided so that the second objective lens 35 for a high density optical disc is installed in a more inner diameter of the optical disc than the first objective lens 31 for a low density optical disc. As described in a subsequent embodiment, the first objective lens 31 for a low density optical disc may be installed in a more inner diameter of the optical disc than the second objective lens 35 for a high density optical disc. In this case, there are advantages that will be described as below.

Figure 14:
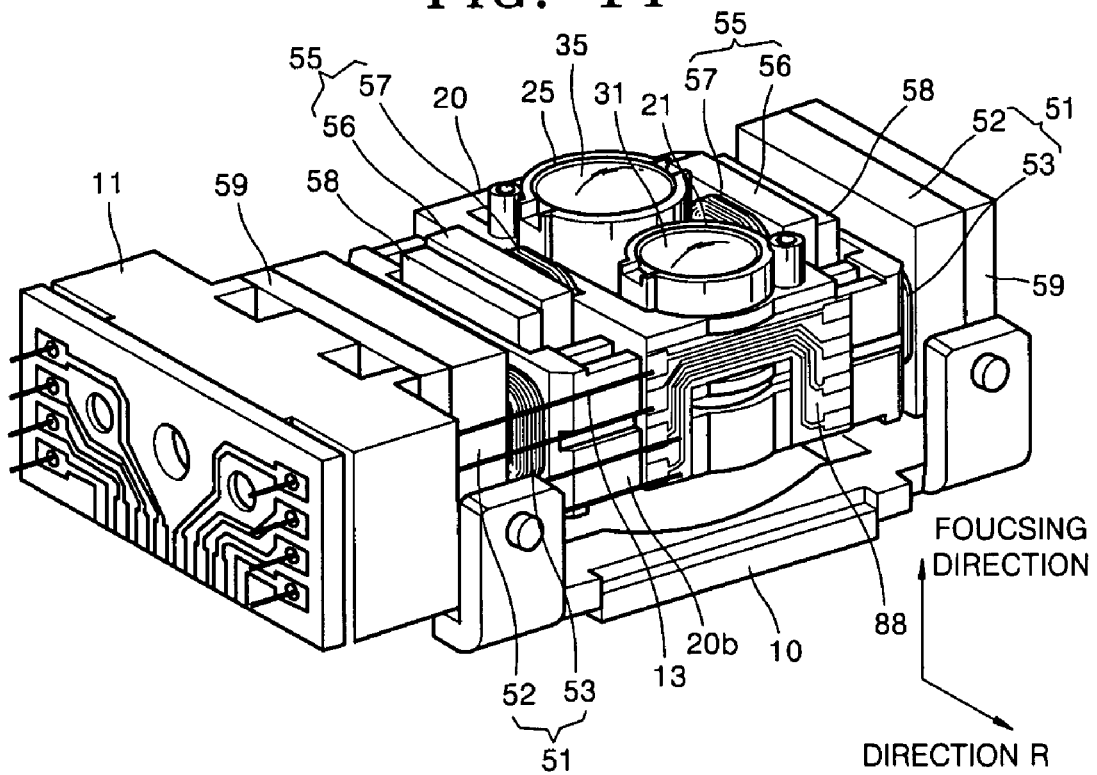
FIG. 14 is a schematic perspective view of an actuator used with an optical pickup according to another embodiment of the present invention.
Figure 15:
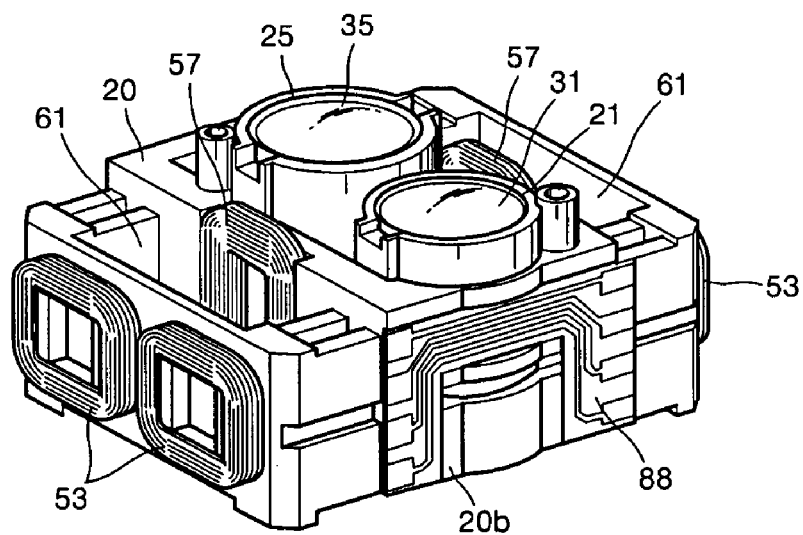
FIG. 15 is a perspective view of a moving portion of FIG. 14.
Figure 16:
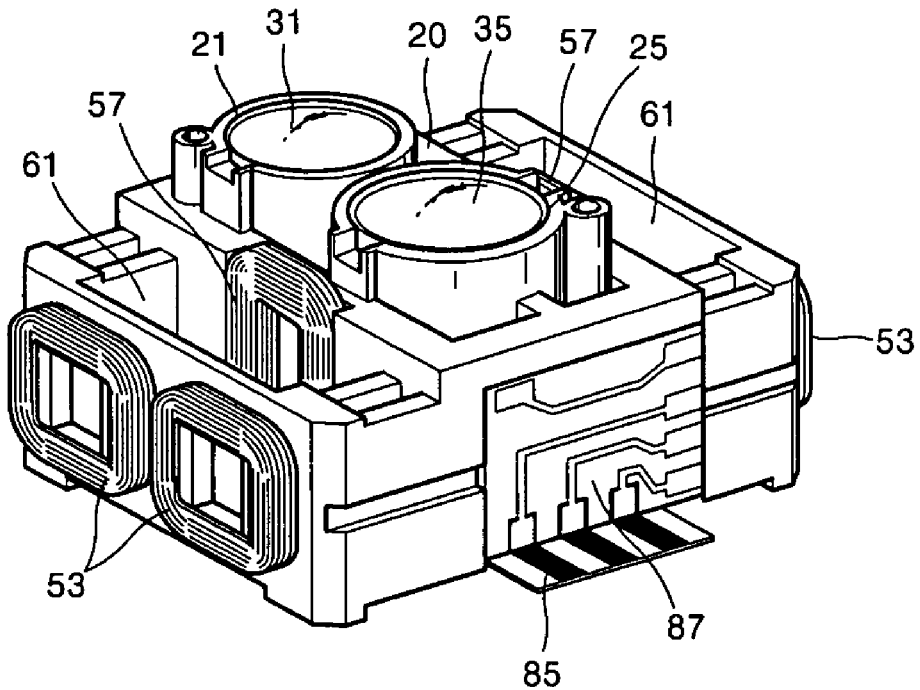
FIG. 16 is a perspective view of FIG. 15 rotated at an angle of about 180°.
Figure 17:
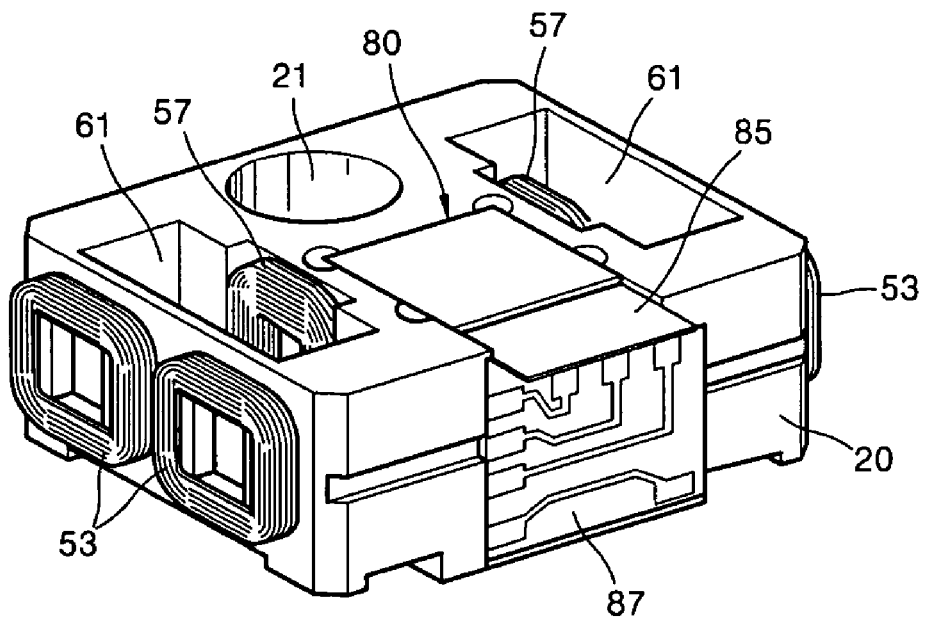
FIG. 17 is a rear perspective view of FIG. 16.
Figure 18:
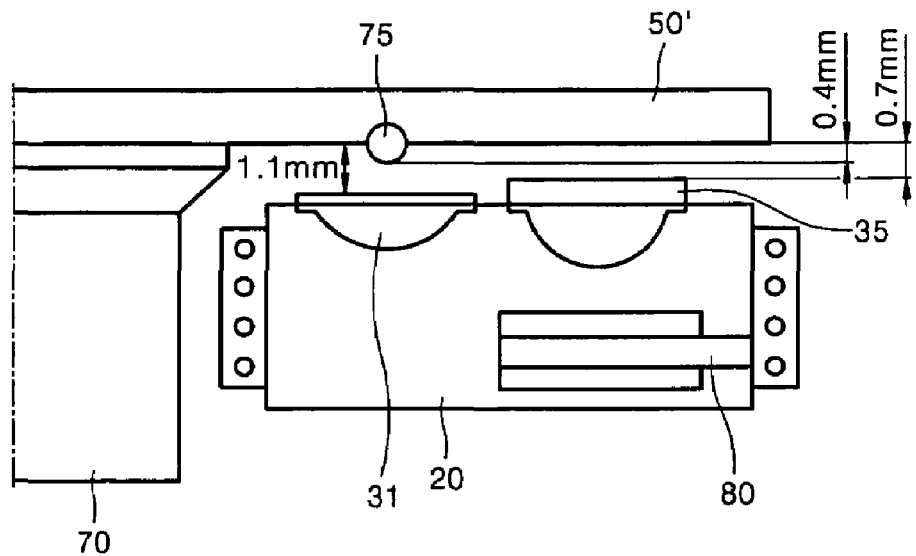
FIG. 18 schematically illustrates the arrangement of first and second objective lenses installed in a lens holder of the actuator used with an optical pickup of FIG. 14 and the arrangement of a liquid crystal panel for aberration correction.

FIG. 14 is a schematic perspective view of an actuator used with an optical pickup according to another embodiment of the present invention, FIG. 15 is a perspective view of a moving portion of FIG. 14, FIG. 16 is a perspective view of FIG. 15 rotated at an angle of about 180°, and FIG. 17 is a rear perspective view of FIG. 16. In addition, FIG. 18 schematically illustrates the arrangement of first and second objective lenses installed in a lens holder of the actuator used with an optical pickup of FIG. 14 and the arrangement of a liquid crystal panel for aberration correction. Here, elements having substantially the same or similar functions as or to those of the actuator used with an optical pickup according to an embodiment of the present invention denote the same reference numerals as possible, and a repeated description thereof will be omitted.

Referring to FIGS. 14 through 18, there is a difference between the actuator used with an optical pickup according to second embodiment of the present invention and the actuator used with an optical pickup according to the first embodiment of the present invention in that the first installation hole 21 is formed in the lens holder 20 so that the first installation hole is disposed in a more inner diameter of the optical disc than the second installation hole 25 and the first objective lens 31 for a low density optical disc is installed in a more inner diameter of the optical disc than the second objective lens 35 for a high density optical disc. Even in the present embodiment, the first and second objective lenses 31 and 35 are installed in the first and second installation holes 21 and 25 to satisfy the above Equation 1.

Like in an embodiment of the present invention, if the second objective lens 35 is installed in a more inner diameter of the optical disc than the first objective lens 31, the second objective lens 35 may be interfered with a stack ring formed in the optical disc, for example, when a position in which an information region of the optical disc starts is accessed.

FIG. 18 illustrates the case where an optical disc 50' having a stack ring 75 is mounted on a spindle motor 70. The stack ring 75 is formed in positions of CD and DVD, which correspond to about 16.5-19.5 mm from a center of the optical disc 50'. The stack ring 75 protrudes from a surface of the optical disc 50', for example, by a maximum of 0.4 mm.

When the first objective lens 31 is used as a CD/DVD and the second objective lens 35 is used as a BD, basic separation distances between the first and second objective lenses 31 and 35 and the optical disc 50' may be 1.1 mm and 0.7 mm, respectively, as illustrated in FIG. 18. Thus, when the second objective lens 35 having a smaller basic separation distance is disposed in an outer circumference of the optical disc 50', collision between the second objective lens 35 and the stack ring 75 can be prevented.

In the actuator used with an optical pickup according to the present embodiment, the center of the second installation hole 25 may be located, for example, in a position which corresponds 21 mm from the center of the optical disc 50', and the center of the first installation hole 21 may be located in a position which corresponds to 14.4-18.4 mm, for example, from the center of the optical disc 50'.

As illustration in FIG. 18, when the second objective lens 35 for a high density optical disc is installed in a more outer diameter than the first objective lens 31 for a low density optical disc, even in the adoption of the optical disc 50' having the stack ring 75, the second objective lens 35 having a shorter working distance may be prevented from colliding with the stack ring 75.

When the first objective lens 31 for a low density optical disc is installed in a more inner diameter than the second objective lens 35 for a high density optical disc as described above, the following advantages can be obtained.

In other words, as shown in FIGS. 17 and 18, the actuator used with an optical pickup according to the second embodiment of the present invention may further include a liquid crystal panel 80r correcting a spherical aberration caused by a difference in thickness of optical discs and being disposed below the second objective lens 35 for a high density optical disc of the lens holder 20. By installing the second objective lens 35 in an outer circumference of the optical disc 50', a space required for forming a conductive line of the liquid crystal panel 80 can be obtained.

Figure 19A:
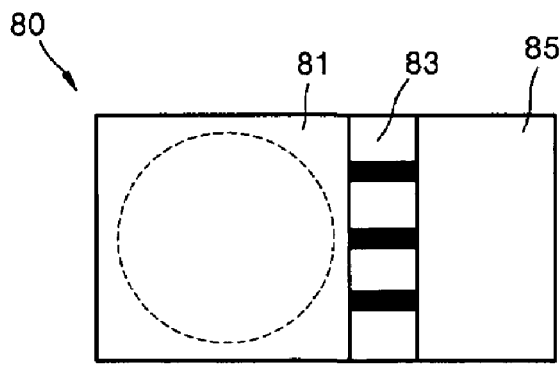
FIG. 19A is a schematic plane view of the liquid crystal panel of FIG. 18.
Figure 19B:
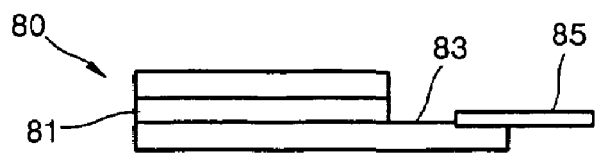
FIG. 19B is a schematic side view of the liquid crystal panel of FIG. 19A.
Figure 19C:
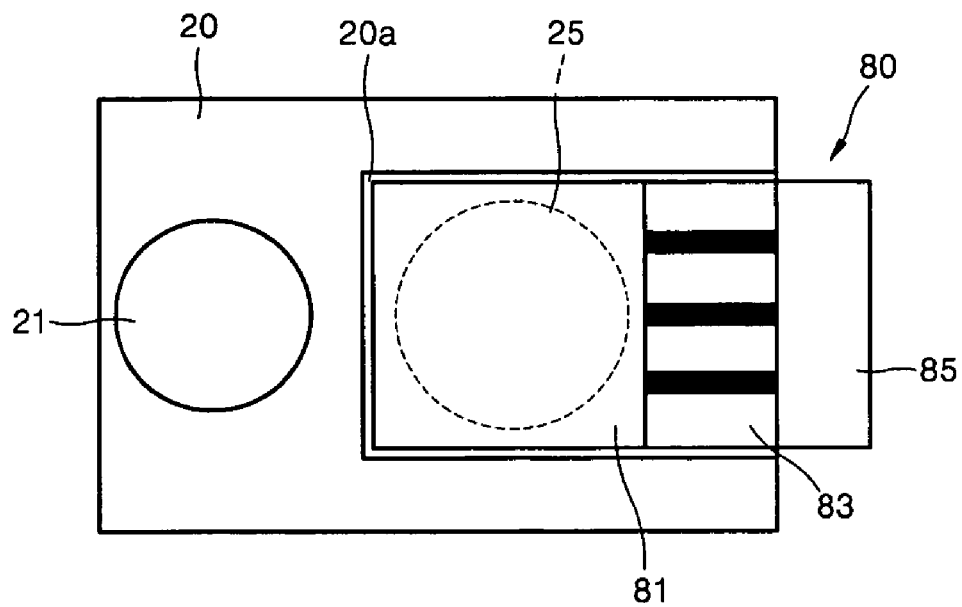
FIG. 19C illustrates the state in which the liquid crystal panel is installed in the lens holder so that it is disposed below the second installation hole in which the second objective lens for a high density optical disc is installed.

FIG. 19A is a schematic plane view of the liquid crystal panel 80, FIG. 19B is a schematic side view of the liquid crystal panel 80, and FIG. 19C illustrates the state in which the liquid crystal panel 80 is installed in the lens holder 20 so that it is disposed below the second installation hole 25 in which the second objective lens 35 for a high density optical disc is installed.

Referring to FIG. 19A through 19C, the liquid crystal panel 80 may include a liquid crystal portion 81 in which liquid crystal is contained, a conductive line-forming portion 83, and a printed circuit board (PCB) 85 for forming a conductive line path. The liquid crystal portion 81 of the liquid crystal panel 80 has a square shape, the conductive line-forming portion 83 has a rectangular shape, and a glass substrate is used in forming the liquid crystal portion 81 and the conductive line-forming portion 83. The PCB 85 for forming the conductive line path is attached to one side of the conductive line-forming portion 83.

Figure 20A:
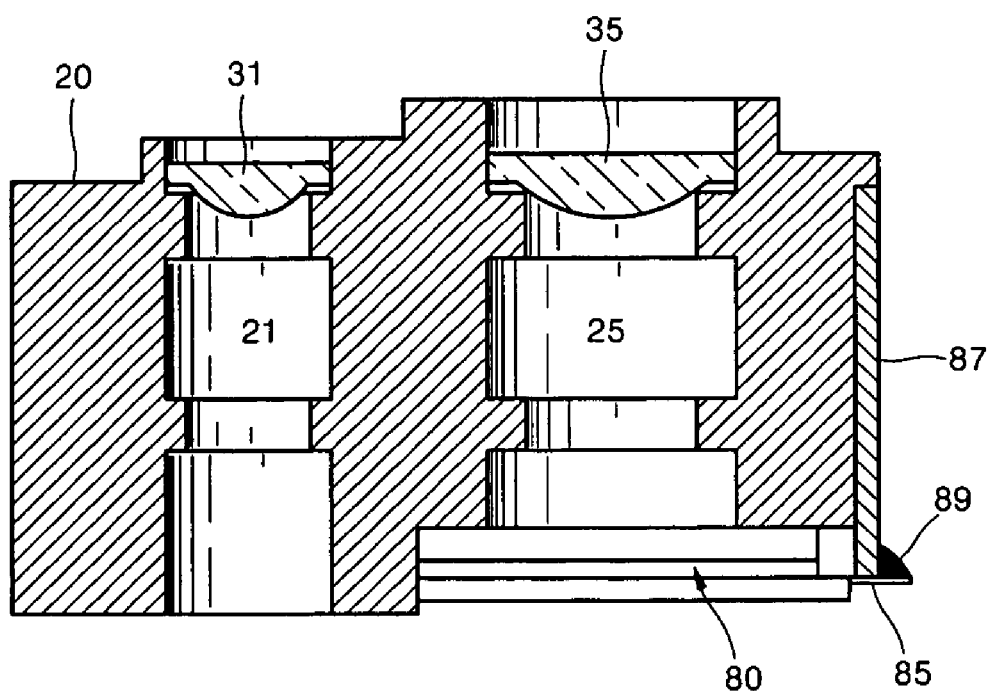
FIG. 20A is a front cross-sectional view of the lens holder illustrating a soldering point between a PCB for forming a conductive line path and a PCB plate.
Figure 20B:
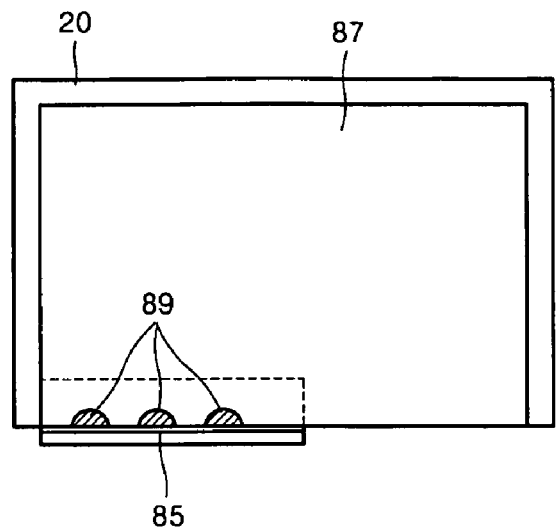
FIG. 20B is a right side view of FIG. 20A.

A PCB plate 87 electrically connected to the liquid crystal panel 80 is attached to sides of the second objective lens 35 of the lens holder 20, as illustrated in FIGS. 16 and 17. A connection between the PCB 85 and the PCB plate 87 is created by soldering a protruding portion of the PCB 85 and an end of the PCB plate 87 located about perpendicular to the protruding portion of the PCB 85, as illustrated in FIGS. 20A and 20B. As such, a conductive line on the PCB 85 for forming the conductive line path and a conductive line on the PCB plate 87 is electrically connected. Reference numeral 89 of FIGS. 20A and 20B denotes a soldering point.

FIG. 20A is a front cross-sectional view of the lens holder 20 illustrating the soldering point 89 between the PCB 85 for forming a conductive line path and the PCB plate 87. FIG. 20B is a right side view of FIG. 20A.

As in the actuator used with an optical pickup according to the first embodiment, when the second objective lens 35 for a high density optical disc is installed in an outer circumference of the optical disc, a sufficient space required for connecting the liquid crystal panel 80 installed below the second objective lens 35 and the PCB plate 87 to each other can be obtained.

Here, since a separation space between the lens holder 20 of the actuator used with an optical pickup and the spindle motor 70 becomes very narrow, when the optical pickup is disposed in an innermost circumference of the optical disc, as in FIGS. 20A and 20B, it is difficult to obtain space for soldering a connection with a structure in which the PCB 85 for forming the conductive line path protrudes and the PCB plate 87 is located on the PCB 85. Thus, in this case, soldering between the PCB 85 and the PCB plate 87 may also be performed from the side of the lens holder 20 by bending the PCB 85 for forming the conductive line path. In this case, there is a difficulty in which a short may occur in a bending portion.

However, as illustrated in FIGS. 20A and 20B, when the second objective lens 35 for a high density optical disc is installed in a more outer circumference than the first objective lens 31 for a low density optical disc, a sufficient space can be obtained and a conductive line connection of the liquid crystal panel 80 can be performed in a perpendicular shape. Thus, a short does not occur in a bending portion.

As illustrated in FIG. 19C, a rectangular groove 20a for attaching the liquid crystal panel 80 may be formed in a lower end of the lens holder 20. In this case, the width of the rectangular groove 20a may be larger than the width of the liquid crystal panel 80, by a minimum of 0.1 mm, for example, so that the position of the liquid crystal panel 80 can be adjusted when it is attached to the lower end of the lens holder 20.

Referring to FIGS. 14 and 15, a PCB plate 88 for forming a conductive line path of coils of a magnetic circuit, that is, the first and second magnetic circuits 51 and 55 may be attached to an inner circumference side 20b of the optical disc which is an opposite side of a side at which the PCB 87 for the liquid crystal panel 80 of the lens holder 20 is installed. In this case, the side 20b may have a double stepped structure formed as both a round shape and a planar shape, so that a laser light passing through the first installation hole 21 is not interfered, as illustrated in FIGS. 14 and 15.

In the actuator used with an optical pickup according to the second embodiment of the present invention, the magnetic circuit, like in FIGS. 2 and 3, is divided into a first magnetic circuit 51 to drive the first and second objective lenses 31 and 35 in the focusing direction, and a second magnetic circuit 55 to drive the first and second objective lenses 31 and 35 in the tracking direction. Except that a pair of focusing coils 53 are installed in a direction R at both sides of the lens holder 20 parallel with the direction R, the remaining structure is substantially the same as that of FIGS. 2 and 3.

When a tilt driving current is applied so that a tilt driving force is applied in the upper direction of one focusing coil of the pair of focusing coils installed at each of sides of the lens holder 20 a tilt driving force is applied in the lower direction of another focusing coil, radial tilt can be controlled.

Thus, when the pair of focusing coils 53 are installed at both sides of the lens holder 20 parallel with the direction R as described above, three-axis driving in which focusing driving, tracking driving, and radial tilt control are performed can be implemented.

In the actuator used with an optical pickup according to embodiments of the present invention, when the first objective lens 31 installed in the first installation hole 21 is a lens used for both a CD and a DVD, a working distance WD of the first objective lens 31 with respect to a CD is represented as $WD_{CD}$ and a working distance of the first objective lens 31 with respect to a DVD is represented as $WD_{DVD}$, the first objective lens 31 should be installed in the first installation hole 21 so that a separation distance with respect to the optical disc of the first objective lens 31 satisfies the following equation, thereby reducing the entire moving distance of the actuator:

$$WD_{DVD} \geqq WD_{CD} \quad \text{Equation 2:}$$

$WD_{CD} \leqq$ the separation distance between the optical disc and the first objective lens $\leqq WD_{DVD}$ When the first objective lens 31 installed in the first installation hole 21 is a lens used for both a CD and a DVD, a separation distance WD1 with respect to the optical disc of the first objective lens 31 satisfying Equation 1 is a value between a working distance of the first objective lens 31 with respect to the CD and a working distance of the first objective lens 31 with respect to the DVD, as shown in Equation 2. In this case, when a CD or a DVD is used as the optical disc, the entire moving distance of the actuator can be reduced.

Here, even in the actuator used with an optical pickup shown in FIGS. 2 and 3, the first installation hole 21 may be formed to satisfy Equation 2 and the first objective lens 31 may be installed in the first installation hole 21.

Although the actuator used with an optical pickup according to the embodiments of the present invention is described and illustrated as a structure in which a lens for a CD and/or a DVD is provided for the first objective lens 31 and a lens for a BD is provided for the second objective lens 35, this is only an example, and the present invention is not limited thereto.

That is, when a working distance of the first objective lens 31 for a low density optical disc installed in the first installation hole 21 is represented as WD1 and a working distance of the second objective lens 35 for a high density optical disc installed in the second installation hole 25 is represented as WD2, the first and second installation holes 21 and 25 may be provided so that the first and second objective lenses 31 and 35 satisfy the following equation.

Equation 3:

if $WD1 \geqq WD2$ (in this case, the size of WD1 and WD2 is equal to or greater than a minimum of 0.6 mm), the separation distance between the optical disc and the first objective lens=WD1 the separation distance between the optical disc and the second objective lens=WD2+β if $WD1 \leqq WD2$ (in this case, the size of WD1 and WD2 is equal to or greater than a minimum of 0.6 mm), the separation distance between the optical disc and the first objective lens=WD1+β the separation distance between the optical disc and the second objective lens=WD2 where, $\beta \geqq 0.1$.

When the first and second installation holes 21 and 25 are provided so that the first and second objective lenses 31 and 35 are installed to satisfy Equation 3, if the optical disc is installed and the first objective lens 31 or the second objective lens 35 operates, contact between the optical disc and the first objective lens 31 or the second objective lens 35 can be prevented.

When the above equation is satisfied, an optical recording and/or reproducing apparatus having the actuator used with an optical pickup according to the first embodiment or the second embodiment of the present invention may adopt a CD and/or a DVD for a low density optical disc and an HD DVD for a high density optical disc, for example.

Although the actuator used with an optical pickup according to the embodiments of the present invention is described and illustrated as a structure in which the two objective lenses 31 and 35 having different working distances are installed in one lens holder 20, this is only an example, and the present invention is not limited thereto. That is, the actuator used with an optical pickup according to the embodiments of the present invention has a structure in which two or more objective lenses are installed in one lens holder, and thus can be adopted in the optical pickup such that two or three or more kinds of optical discs having different recording densities, such as CDs, DVDs, and high density optical discs can be compatible with and recorded and/or reproduced.

The optical pickup in which the above-mentioned actuator according to the embodiments of the present invention can be adopted may have a structure in which an optical system to record and/or reproduce high density optical discs and an optical system to record and/or reproduce low density optical discs, such as DVDs (and additionally, CDs), are separately included. Specific examples of an optical structure of the optical pickup adopting the actuator according to the embodiments of the present invention can be understood by people skilled in the art, and thus detailed descriptions and illustrations of specific examples of the optical structure of the optical pickup adopting the actuator according to the embodiments of the present invention will be omitted.

Hereinafter, the operation of an optical disc drive in which the actuator used with an optical pickup according to an embodiment of the present invention is adopted will be described.

If the optical disc is inserted into the optical disc drive, the type of optical disc is determined by a photodetector installed in the optical pickup or a separate detection device. The type of optical discs is discriminated according to a recording density.

In the optical disc drive in which the actuator used with an optical pickup according to an embodiment of the present invention is adopted, when the discrimination of the type of the optical disc is completed, focusing and tracking servos for an objective lens corresponding to the type of the optical disc sequentially operate. That is, if the inserted optical disc is a high density optical disc, the focusing and tracking servos operate such that the objective lens, arranged in an inner diameter of the lens holder, is located in a proper position of the optical disc. Also, if the inserted optical disc is a low density optical disc (for example, a DVD or CD), the focusing and tracking servos operate such that the objective lens, arranged in an outer diameter of the lens holder, is located in a proper position of the optical disc.

In the optical disc drive in which the actuator used with an optical pickup according to the second embodiment of the present invention is adopted, when the discrimination of the type of the optical disc is completed, focusing and tracking servos for an objective lens corresponding to the type of the optical disc sequentially operate. That is, if the inserted optical disc is a high density optical disc, the focusing and tracking servos operate such that the objective lens, arranged in an outer diameter of the lens holder, is located in a proper position of the optical disc. Also, if the inserted optical disc is a low density optical disc (for example, a DVD or CD), the focusing and tracking servos operate such that the objective lens, arranged in an inner diameter of the lens holder, is located in a proper position of the optical disc.

Here, the focusing and tracking servos refer to focusing and tracking error signals detected by the photodetector installed in the optical pickup, allowing current to flow through the focusing and tracking coils attached to the moving portion of the actuator, thereby generating the displacement of the moving portion. When the current flows through the focusing and tracking coils, an electromagnetic force is generated by the interaction between the current flowing through the focusing and tracking coils and the magnetic flux generated in the focusing magnet and the tracking magnet such that the lens holder is moved in the focusing and tracking directions.

Figure 21:
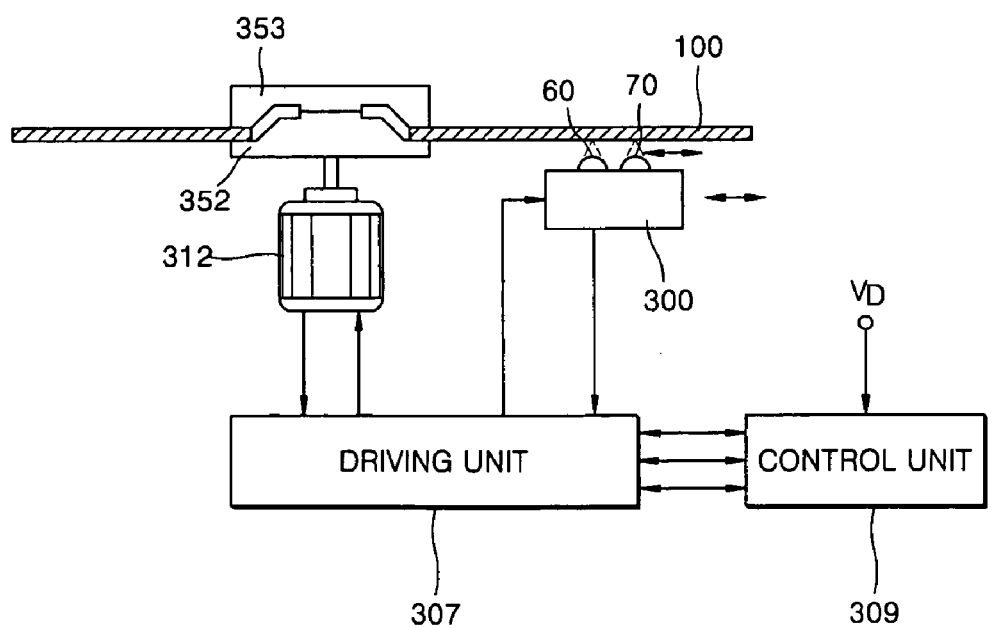
FIG. 21 schematically illustrates the structure of an optical recording and/or reproducing apparatus in which the actuator used with an optical pickup according to the present invention is adopted.

FIG. 21 schematically illustrates the structure of an optical recording and/or reproducing apparatus in which the actuator used with an optical pickup according to the present invention is adopted.

Referring to FIG. 21, the optical recording and/or reproducing apparatus includes a spindle motor 312 for rotating an optical disc 100, an optical pickup 300 being installed to move in the direction of a radius of the optical disc 100 and reproducing information recorded on the optical disc 100 or recording information on the optical disc 100, a driving unit 307 for driving the spindle motor 312 and the optical pickup 300, and a control unit 309 for controlling focusing, tracking and/or tilt servos of the optical pickup 300. Here, reference numeral 352 denotes a turntable and reference numeral 353 denotes a clamp for chucking the optical disc 100.

The optical pickup 300 includes an optical pickup optical system having the first and second objective lenses 25 and 35, arranged in a direction R, for focusing light emitted from a light source onto the optical disc 100, and an optical pickup actuator for driving the first and second objective lenses 25 and 35. In this case, the actuator used with an optical pickup according to one of the embodiments of the present invention as described previously can be adopted for the optical pickup actuator.

The light reflected from the optical disc 100 is detected by a photodetector installed in the optical pickup 300, photoelectrically transformed, and is changed into an electrical signal, and the electrical signal is inputted into the control unit 309 through the driving unit 307. The driving unit 307 controls a rotational speed of the spindle motor 312, amplifies the inputted signal, and drives the optical pickup 300. The control unit 309 allows the optical pickup 300 to operate a focusing, a tracking and/or a tilt operation by transmitting a focusing servo, a tracking servo and/or a tilt servo command controlled based on the signal inputted from the driving unit 307, to the driving unit 307.

As described above, the actuator used with an optical pickup according to the embodiments of the present invention has a structure in which two objective lenses are installed in one lens holder, and a device required to rotate the objective lenses simultaneously by a predetermined angle with respect to the rotation axis, unlike with a conventional actuator to present an axis perturbation type, is not required, and thus the entire structure of the actuator is simplified.

Also, the actuator used with an optical pickup according to the embodiments of the present invention has a structure in which a magnetic circuit to adjust the lens holder in the tracking direction, and a magnetic circuit to adjust the lens holder in the focusing direction are divided, and thus the weight of the moving portion of the actuator can be reduced, and high sensitivity can be achieved.

Further, the objective lens for a high density optical disc, having a shorter working distance, is installed in the lens holder satisfying Equation 1 supra, and thus interference between the objective lens for a high density disc and the optical disc can be prevented when the high density optical disc is initially installed or a low density optical disc is installed.

Furthermore, in the actuator used with an optical pickup according to another embodiment of the present invention, collision between the optical disc having the stack ring and the objective lens for a high density can be prevented.

Furthermore, the actuator used with an optical pickup according to the embodiments of the present invention has a structure in which the objective lens, having a longer working distance, is installed at a deeper position from the upper side of the lens holder than the objective lens having a shorter working distance, and thus can contribute to make the optical pickup thinner.

Although a few embodiments of the present invention have been shown and described, it would be appreciated by those skilled in the art that changes may be, made in this embodiment without departing from the principles and spirit of the invention, the scope of which is defined in the claims and their equivalents.

What is claimed is:

1. An actuator used with an optical pickup, the actuator comprising:
    a base on which a holder is fixed;
    a lens holder in which a plurality of installation holes are formed such that a plurality of objective lenses, to record and/or reproduce optical discs having different recording densities, are installed at different heights;
    a support member, which movably supports the lens holder, having one end coupled to the lens holder and the other end coupled to the holder; and
    a magnetic circuit which drives the lens holder in focusing and tracking directions,
    the plurality of installation holes include a first installation hole in which a first objective lens for at least one type of low density optical disc is installed, and a second installation hole in which a second objective lens for a high density optical disc is installed,
    wherein when a working distance of the first objective lens for the low density optical disc installed in the first installation hole is represented as WD1, and a working distance of the second objective lens for the high density optical disc installed in the second installation hole is represented as WD2, the first and second installation holes are provided such that the first and second objective lenses are installed to satisfy the Equation:

$$WD1 \geq WD2$$

separation distance between an optical disc of the second objective lens=WD2+α
where, α=|WD1−WD2|×(0.1~1.0),
and the second installation hole is located in a more outer circumference of the optical disc than the first installation hole.

2. The actuator of claim 1, wherein a center of the second installation hole is located in a position corresponding to about R=21 mm from a center of the optical disc and a center of the first installation hole is located in a position corresponding to R=14.4-18.4 mm from the center of the optical disc.

3. The actuator of claim 2, wherein the first and second objective lenses are installed in the first and second installation holes, respectively, so that, when the optical disc is installed in a spindle motor and the second objective lens operates, contact between the second objective lens and a stack ring formed in an optical disc is prevented.

4. The actuator of claim 3, further comprising a liquid crystal panel, correcting a spherical aberration caused by a difference in thickness of the optical discs, and being disposed below the second objective lens inside the lens holder in which the first and second objective lenses are installed.

5. The actuator of claim 4, wherein a rectangular groove for attaching the liquid crystal panel is formed in a lower end of the lens holder, and a width of the rectangular groove is larger than a width of the liquid crystal panel so that a position of the liquid crystal panel is adjusted when the liquid crystal panel is attached to the lower end of the lens holder.

6. The actuator of claim 4, wherein a printed circuit board (PCB) forming a conductive line path is attached to one side of the liquid crystal panel.

7. The actuator of claim 6, wherein a PCB plate is attached to a side of the second objective lens of the lens holder and a connection between the PCB and the PCB plate is performed by soldering an end of the PCB plate, to the PCB forming the conductive line path.

8. The actuator of claim 1, wherein the first and second installation holes are arranged in a direction corresponding to a direction of a radius of the optical disc.

9. The actuator of claim 8, wherein the first magnetic circuit includes a focusing coil installed in the lens holder and a focusing magnet installed on a base opposite to the focusing coil, and the second magnetic circuit includes a tracking coil installed in the lens holder and a tracking magnet installed on a base opposite to the tracking coil.

10. The actuator of claim 9, wherein the tracking magnet is a two-pole magnetized polarization magnet, the poles being disposed in a tracking direction, the tracking coil corresponds to the tracking magnet, and the tracking coil is formed in an almost rectangular shape in which both long sides of the tracking coil are positioned to contribute to generation of an electromagnetic force.

11. The actuator of claim 9, wherein the tracking magnet is a three-pole magnetized polarization magnet, the poles being disposed in a tracking direction, two tracking coils corresponding to the tracking magnet, and the tracking coils are formed in an almost rectangular shape in which both long sides of the tracking coils are positioned to contribute to generation of an electromagnetic force.

12. The actuator of claim 9, wherein the focusing magnet is a two-pole magnetized polarization magnet, the poles being disposed in a focusing direction, the focusing coil corresponds to the focusing magnet, and the focusing coil is formed in an almost rectangular shape in which both long sides of the focusing coil are positioned to contribute to generation of an electromagnetic force.

13. The actuator of claim 1, wherein the low density optical disc is at least one selected from a CD-family optical disc and a DVD-family optical disc, and the high density optical disc has a density higher than the DVD-family optical disc.

14. The actuator of claim 13, wherein when the first objective lens installed in the first installation hole is a lens used for both a CD and a DVD, a working distance of the first objective lens with respect to a CD is represented as $WD_{CD}$ and a working distance of the first objective lens with respect to a DVD is represented as $WD_{DVD}$, the first objective lens is installed in the first installation hole so that a separation distance with respect to the optical disc of the first objective lens satisfies the Equation, thereby reducing a moving distance of the actuator:

$$WD_{DVD} \geq WD_{CD}$$

$WD_{CD} \leq$ a separation distance between the optical disc and the first objective lens $\leq WD_{DVD}$.

15. The actuator of claim 14, wherein the first and second objective lenses are installed in the first and second installation holes, respectively, so that, when the second objective lens operates, contact between the second objective lens and a stack ring formed in an optical disc is prevented.

16. The actuator of claim 1, wherein the magnetic circuit is divided into a first magnetic circuit to drive the objective lenses in the focusing direction, and a second magnetic circuit to drive the objective lenses in the tracking direction.

17. The actuator of claim 16, wherein the first and second magnetic circuits are installed at sides of the lens holder parallel with a direction corresponding to a direction of a radius of the optical disc.

18. An optical recording and/or reproducing apparatus comprising:
an optical pickup including an actuator according to claim 1, the actuator driving an objective lens, being installed to move in a direction of a radius of the disc and reproducing information recorded on the disc or recording information on the disc; and
a control unit controlling servos.

19. The apparatus of claim 18, wherein a center of the second installation hole is located in a position corresponding to about R=21 mm from a center of the optical disc and a center of the first installation hole is located in a position corresponding to R=14.4-18.4 mm from the center of the optical disc.

20. The apparatus of claim 19, wherein the first and second objective lenses are installed in the first and second installation holes, respectively, so that, when the optical disc is installed in a spindle motor and the second objective lens operates, contact between the second objective lens and a stack ring formed in the optical disc is prevented.

21. The apparatus of claim 20, further comprising a liquid crystal panel correcting a spherical aberration caused by a difference in thickness of the optical discs and being disposed below the second objective lens inside the lens holder in which the first and second objective lenses are installed.

22. The actuator of claim 21, wherein a rectangular groove for attaching the liquid crystal panel is formed in a lower end of the lens holder, and a width of the rectangular groove is larger than a width of the liquid crystal panel so that a position of the liquid crystal panel is adjusted when the liquid crystal panel is attached to the lower end of the lens holder.

23. The apparatus of claim 21, wherein a printed circuit board (PCB) forming a conductive line path is attached to one side of the liquid crystal panel.

24. The apparatus of claim 23, wherein a PCB plate is attached to a side of the second objective lens of the lens holder and a connection between the PCB and the PCB plate is performed by soldering an end of the PCB plate to the PCB forming the conductive line path.

25. The apparatus of claim 18, wherein the first and second installation holes are arranged in a direction corresponding to a direction of a radius of the optical disc.

26. The apparatus of claim 18, wherein the low density optical disc is at least one selected from a CD-family optical disc and a DVD-family optical disc, and the high density optical disc has a higher density than the DVD-family optical disc.

27. The apparatus of claim 26, wherein when the first objective lens installed in the first installation hole is a lens used for both a CD and a DVD, a working distance of the first objective lens with respect to the CD is represented as $WD_{CD}$ and a working distance of the first objective lens with respect to the DVD is represented as $WD_{DVD}$, the first objective lens is installed in the first installation hole so that a separation distance with respect to the optical disc of the first objective lens satisfies the Equation, thereby reducing a moving distance of the actuator:

$WD_{DVD} \geqq WD_{CD}$ $WD_{CD} \leqq$ the separation distance between the optical disc and the first objective lens $\leqq WD_{DVD}$.

28. The apparatus of claim 27, wherein the first and second objective lenses are installed in the first and second installation holes, respectively, so that, when the optical disc is installed in a spindle motor and the second objective lens operates, contact between the second objective lens and a stack ring formed in the optical disc is prevented.

29. The actuator of claim 1, wherein a number of the installation holes formed on the lens holder corresponds to a number of the objective lenses to be installed on the installation holes.

30. The actuator of claim 1, wherein the low density optical disc is at least one selected from a CD and/or a DVD, and the high density optical disc is a blu-ray disc.

31. An actuator used with an optical pickup, the actuator comprising:
a base on which a holder is fixed;
a lens holder in which a plurality of installation holes are formed such that a plurality of objective lenses, to record and/or reproduce optical discs having different recording densities, are installed at different heights;
a support member, which movably supports the lens holder, having one end coupled to the lens holder and the other end coupled to the holder; and
a magnetic circuit which drives the lens holder in focusing and tracking directions,
the plurality of installation holes include a first installation hole in which a first objective lens for at least one type of low density optical disc is installed, and a second installation hole in which a second objective lens for a higher density optical disc than the low density optical disc is installed,
wherein when a working distance of the first objective lens for the low density optical disc installed in the first installation hole is represented as WDI, and a working distance of the second objective lens for the high density optical disc installed in the second installation hole is represented as WD2, the first and second installation holes are provided such that the first and second objective lenses satisfy the Equation:
if WD1≧WD2 (in this case, the size of WD1 and WD2 is equal to or greater than a minimum of 0.6 mm),
the separation distance between the optical disc and the first objective lens=WD1;
the separation distance between the optical disc and the second objective lens=WD2+β;
if WD1≦WD2 (in this case, the size of WD1 and WD2 is equal to or greater than a minimum of 0.6 mm),
the separation distance between the optical disc and the first objective lens=WD1+β;
the separation distance between the optical disc and the second objective lens=WD2;
where, β≧0.1,
and the second installation hole is located in a more outer circumference of the optical disc than the first installation hole.

* * * * *

UNITED STATES PATENT AND TRADEMARK OFFICE
CERTIFICATE OF CORRECTION

PATENT NO.         : 7,458,086 B2
APPLICATION NO.    : 11/056401
DATED              : November 25, 2008
INVENTOR(S)        : Seok-jung Kim et al.

Page 1 of 1

It is certified that error appears in the above-identified patent and that said Letters Patent is hereby corrected as shown below:

Title Page, Item (57) Abstract, line 23, change $\alpha = 1WD1 - WD21 \times (0.1 \sim 1.0)$ to -- $\alpha = |WD1 - WD2| \times (0.1 \sim 1.0)$ --.

Column 20, line 21, change "WDI" to -- WD1 --.

Signed and Sealed this

Tenth Day of February, 2009

JOHN DOLL
*Acting Director of the United States Patent and Trademark Office*